(12) United States Patent
Sharma (10) Patent No.: US 10,270,715 B2
(45) Date of Patent: Apr. 23, 2019

(54) HIGH PERFORMANCE NETWORK I/O IN A VIRTUALIZED ENVIRONMENT

(71) Applicant: Oracle International Corporation, Redwood Shores, CA (US)

(72) Inventor: Pratik Sharma, Mumbai (IN)

(73) Assignee: Oracle International Corporation, Redwood Shores, CA (US)

( * ) Notice: Subject to any disclaimer, the term of this patent is extended or adjusted under 35 U.S.C. 154(b) by 137 days.

(21) Appl. No.: 15/340,459

(22) Filed: Nov. 1, 2016

(65) Prior Publication Data
US 2018/0123984 A1    May 3, 2018

(51) Int. Cl.
*H04L 12/861* (2013.01)
*H04L 12/741* (2013.01)

(52) U.S. Cl.
CPC .......... *H04L 49/9047* (2013.01); *H04L 45/74* (2013.01); *H04L 49/9094* (2013.01)

(58) Field of Classification Search
None
See application file for complete search history.

(56) References Cited

U.S. PATENT DOCUMENTS

| | | | | |
|---|---|---|---|---|
| 8,060,644 B1* | 11/2011 | Michailidis | .............. | H04L 47/10 709/228 |
| 9,135,043 B1* | 9/2015 | Srinivasan | .......... | G06F 9/45558 |
| 2009/0183180 A1* | 7/2009 | Nelson | ............... | G06F 9/45533 719/319 |
| 2010/0023626 A1* | 1/2010 | Hussain | .................. | H04L 49/90 709/227 |
| 2012/0166738 A1* | 6/2012 | Gower | .................... | G06F 9/547 711/148 |
| 2012/0284712 A1 | 11/2012 | Nimmagadda et al. | | |
| 2016/0048464 A1* | 2/2016 | Nakajima | ........... | G06F 12/1475 711/152 |

OTHER PUBLICATIONS

"PCI-SIG SR-IOV Primer", Intel® LAN Access Division, Revision 2.5, Jan. 2011, 28 pages.

* cited by examiner

*Primary Examiner* — Donald L Mills
(74) *Attorney, Agent, or Firm* — Kilpatrick Townsend & Stockton LLP (57) ABSTRACT

From received data packets intended for a target virtual machine of a virtualization system, a destination network address of the target virtual machine is determined, and a current write buffer pointer is identified that points to a buffer associated with the identified target virtual machine corresponding to the destination network address. If the identified write buffer pointer indicates that the buffer has sufficient available space to accept the data packets, and if the associated buffer has sufficient available space, the data packets are placed in the associated buffer in buffer data locations according to a calculated new write buffer pointer value, and a wakeup byte data message is sent to a designated socket of the target virtual machine. Generally, the target virtual machine detects the wakeup byte data message at the designated socket and, in response, retrieves the data packets from the associated buffer in accordance with the new write buffer pointer value.

20 Claims, 11 Drawing Sheets

| VM 1 | RB bitmap 504 1111...1111 | RB write pointer 506 00...000000001 | RB read pointer 507 00...000000000 | RB memory 508 16 | D1 510 | D2 512 | ... | Dn 514 |
|---|---|---|---|---|---|---|---|---|
| VM 1 | RB bitmap 504 01111111...11 | RB write pointer 506 00...000000010 | RB read pointer 507 00...000000000 | RB memory 508 15 | D1 510 | D2 512 | ... | Dn 514 |
| VM 1 | RB bitmap 504 00111111...11 | RB write pointer 506 00...000000011 | RB read pointer 507 00...000000000 | RB memory 508 14 | D1 510 | D2 512 | ... | Dn 514 |
| VM 1 | RB bitmap 504 00011111...11 | RB write pointer 506 00...000000100 | RB read pointer 507 00...000000000 | RB memory 508 13 | D1 510 | D2 512 | ... | Dn 514 |
| VM 1 | RB bitmap 504 00001111...11 | RB write pointer 506 00...000000101 | RB read pointer 507 00...000000000 | RB memory 508 12 | D1 510 | D2 512 | ... | Dn 514 |
| VM 1 | RB bitmap 504 00000111...11 | RB write pointer 506 00...000000110 | RB read pointer 507 00...000000000 | RB memory 508 11 | D1 510 | D2 512 | ... | Dn 514 |
| VM 1 | RB bitmap 504 00000011...11 | RB write pointer 506 00...000000111 | RB read pointer 507 00...000000000 | RB memory 508 10 | D1 510 | D2 512 | ... | Dn 514 |
| VM 1 | RB bitmap 504 00000001...11 | RB write pointer 506 00...000001000 | RB read pointer 507 00...000000000 | RB memory 508 9 | D1 510 | D2 512 | ... | Dn 514 |

| | | | | | | | | |
|---|---|---|---|---|---|---|---|---|
| VM 1 RB 1 | RB bitmap 504 1111...1111 | RB write pointer 506 00...000000001 | RB read pointer 507 00...000000000 | RB memory 508 16 | D1 510 | D2 512 | ... | Dn 514 |

1010

| | | | | | | | | |
|---|---|---|---|---|---|---|---|---|
| VM 1 RB 1 | RB bitmap 504 01111111...11 | RB write pointer 506 00...000000010 | RB read pointer 507 00...000000000 | RB memory 508 15 | D1 510 | D2 512 | ... | Dn 514 |

1012

| | | | | | | | | |
|---|---|---|---|---|---|---|---|---|
| VM 1 RB 1 | RB bitmap 504 00111111...11 | RB write pointer 506 00...000000011 | RB read pointer 507 00...000000000 | RB memory 508 14 | D1 510 | D2 512 | ... | Dn 514 |

1014

| | | | | | | | | |
|---|---|---|---|---|---|---|---|---|
| VM 1 RB 1 | RB bitmap 504 00011111...11 | RB write pointer 506 00...000000100 | RB read pointer 507 00...000000000 | RB memory 508 13 | D1 510 | D2 512 | ... | Dn 514 |

1016

| | | | | | | | | |
|---|---|---|---|---|---|---|---|---|
| VM 1 RB 1 | RB bitmap 504 00001111...11 | RB write pointer 506 00...000000101 | RB read pointer 507 00...000000000 | RB memory 508 12 | D1 510 | D2 512 | ... | Dn 514 |

1018

| | | | | | | | | |
|---|---|---|---|---|---|---|---|---|
| VM 1 RB 2 | RB bitmap 504 1111...1111 | RB write pointer 506 00...000000001 | RB read pointer 507 00...000000000 | RB memory 508 16 | D1 510 | D2 512 | ... | Dn 514 |

1020

| | | | | | | | | |
|---|---|---|---|---|---|---|---|---|
| VM 1 RB 2 | RB bitmap 504 01111111...11 | RB write pointer 506 00...000000010 | RB read pointer 507 00...000000000 | RB memory 508 15 | D1 510 | D2 512 | ... | Dn 514 |

1022

| | | | | | | | | |
|---|---|---|---|---|---|---|---|---|
| VM 1 RB 2 | RB bitmap 504 00111111...11 | RB write pointer 506 00...000000011 | RB read pointer 507 00...000000000 | RB memory 508 14 | D1 510 | D2 512 | ... | Dn 514 |

| | 1110 | | | | | | | |
|---|---|---|---|---|---|---|---|---|
| VM 1 | RB bitmap 504 1111...1111 | RB write pointer 506 00...000000001 | RB read pointer 507 00...000000000 | RB memory 508 16 | D1 510 | D2 512 | ... | Dn 514 |

| | 1112 | | | | | | | |
|---|---|---|---|---|---|---|---|---|
| VM 1 | RB bitmap 504 01111111...11 | RB write pointer 506 00...000000010 | RB read pointer 507 00...000000000 | RB memory 508 15 | D1 510 | D2 512 | ... | Dn 514 |

| | 1114 | | | | | | | |
|---|---|---|---|---|---|---|---|---|
| VM 1 | RB bitmap 504 00111111...11 | RB write pointer 506 00...000000011 | RB read pointer 507 00...000000000 | RB memory 508 14 | D1 510 | D2 512 | ... | Dn 514 |

| | 1116 | | | | | | | |
|---|---|---|---|---|---|---|---|---|
| VM 1 | RB bitmap 504 00011111...11 | RB write pointer 506 00...000000100 | RB read pointer 507 00...000000000 | RB memory 508 13 | D1 510 | D2 512 | ... | Dn 514 |

| | 1118 | | | | | | | |
|---|---|---|---|---|---|---|---|---|
| VM 2 | RB bitmap 504 1111...1111 | RB write pointer 506 00...000000001 | RB read pointer 507 00...000000000 | RB memory 508 16 | D1 510 | D2 512 | ... | Dn 514 |

| | 1120 | | | | | | | |
|---|---|---|---|---|---|---|---|---|
| VM 2 | RB bitmap 504 01111111...11 | RB write pointer 506 00...000000010 | RB read pointer 507 00...000000000 | RB memory 508 15 | D1 510 | D2 512 | ... | Dn 514 |

| | 1122 | | | | | | | |
|---|---|---|---|---|---|---|---|---|
| VM 2 | RB bitmap 504 00111111...11 | RB write pointer 506 00...000000011 | RB read pointer 507 00...000000000 | RB memory 508 14 | D1 510 | D2 512 | ... | Dn 514 |

| | 1124 | | | | | | | |
|---|---|---|---|---|---|---|---|---|
| VM 2 | RB bitmap 504 00011111...11 | RB write pointer 506 00...000000100 | RB read pointer 507 00...000000000 | RB memory 508 13 | D1 510 | D2 512 | ... | Dn 514 |

HIGH PERFORMANCE NETWORK I/O IN A VIRTUALIZED ENVIRONMENT

BACKGROUND OF THE INVENTION

Virtualization is a computing trend that abstracts hardware to allow multiple workloads to share a common set of resources. Virtualization permits executing multiple environments on a single computer system. The multiple environments are called virtual machines. On shared virtualized hardware, a variety of workloads can co-locate while maintaining full isolation from each other, can freely migrate across infrastructures, and can scale as needed. The single computer system that is supporting the multiple virtual machines is generally referred to as the host machine. Each of the virtual machines is generally referred to as a guest machine. The host machine is generally connected to a system network or bus, over which data to be serviced by a system resource will travel. In most systems, data containing data packets that are intended for one of the virtual machines are received from a system bus or network over a Network Interface Card (NIC), then are sent to the host, and then sent to the virtual machine.

The virtual machines (VM's) may execute their own workload, but they still generally must share resources of the host machine. The shared resources of the host machine may include, for example, memory or external data storage or input/output facilities. The operation of the shared resources must be managed so that each of the VM's in the system can obtain access to the resource so their respective service requests may be executed, or processed. As each of the VM's sends or receives data with respect to an associated host machine resource, each of the sending VM's will need to obtain exclusive use of the resource, even if only for a limited time. The processing of data packets coming to and from the VM's for purposes of utilizing shared resources can create performance bottlenecks, such as data traffic problems in the host machine. Such data traffic problems may devolve into problems referred to as deadlock and livelock. In each of these data lock situations, a shared resource may be unable to communicate with VM's that require its functions, either because the state of the resource may be locked in a busy state (deadlock), or the state of the VM's may have become unstable and are constantly changing (livelock).

Solutions to the problem of deadlock and livelock have been proposed. Such solutions include, for example, data input/output (I/O) virtualization features that facilitate offloading of multi-core packet processing to network adapters, as well as direct assignment of virtual machines to virtual functions, including disk I/O. Examples of the proposed systems include Virtual Machine Device Queues (VMDQ), Single Root I/O Virtualization (SR-IOV, also a PCI-SIG standard), and the like.

Unfortunately, some solutions to deadlock and livelock shift the performance bottleneck of VM's from one system location to another. The processing demanded of the VM's for handling data packets in need of service by system resources is still a performance bottleneck. For example, in some VM systems, on packet arrival, the NIC interrupts the CPU core which handles incoming packets. The packet is copied into the memory space of the target VM and an interrupt is generated for the target VM for handing the packet. If packet buffers are not available in the user address space, additional buffer copying may be needed. If target VMs are serving high bandwidth connections, the VM system may not be able to keep up with incoming packets and may run into a receive livelock scenario.

SUMMARY

The techniques disclosed herein can help overcome the performance bottleneck introduced by conventional attempts to provide solutions. More particularly, embodiments provide techniques for receiving data packets intended for a target virtual machine of the virtualization system, and determining a destination network address of the target virtual machine from the received data packets, and for identifying a current write buffer pointer that points to a buffer associated with the identified target virtual machine that corresponds to the destination network address. The techniques also provide for determining if the identified write buffer pointer indicates that the associated buffer has sufficient available space to accept the data packets and, responsive to determining that the associated buffer has sufficient available space, placing the data packets in the associated buffer by the virtual machine manager in buffer data locations according to a calculated new write buffer pointer value, and sending a wakeup byte data message from the virtual machine manager to a designated socket of the target virtual machine. Generally, the target virtual machine detects the wakeup byte data message at the designated socket and, in response, retrieves the data packets from the associated buffer in accordance with the new write buffer pointer value.

Embodiments of the present disclosure include non-blocking, event-based I/O loops, such as ring buffers, to avoid the receive livelock situation. When a target VM boots up and its associated network interface is functioning, one or more ring buffers are pre-allocated in user memory space, per a virtual network interface. Each of the ring buffers comprises a non-blocking, event-based I/O loop. Additional necessary metadata about the ring buffers for tracking their use, current positions, and the like is maintained. The CPU core handing incoming packets knows the physical address of the pre-allocated buffers in the target VM. Each of the ring buffers is associated with a corresponding socket that is provided with a predetermined value when one or more data packets have been stored in the ring buffer. The receiving entity in the target VM would also use a non-blocking I/O loop, such as a ring buffer. As soon as packet data is transferred to a ring buffer, the socket polled by the receiving entity is signaled so the receiving entity can start processing the data. Since data is posted straight to the buffers in application space, intermediate buffers such as kernel socket buffers are avoided. Thus, the disclosed embodiments limit interrupt handing only to the core which handles incoming packets and eliminates interrupts at the target VM level. In addition, copying data directly to pre-allocated buffers in user space eliminates overhead for intermediate buffer copies.

DETAILED DESCRIPTION

Embodiments of the disclosure pertain to a system and method for overcoming performance bottlenecks that may be introduced by some solutions to deadlock and livelock in computer virtual environments, such as the Single Root I/O Virtualization (SR-IOV) technique. According to some embodiments, a method for using a non-blocking, event-based I/O loop for processing received data packets intended for a shared resource, without requiring a service interrupt for the shared resource is provided.

In some previously known virtual environments, a network interface card (NIC) receives data packets for processing by a shared resource. On packet arrival at the NIC, the NIC interrupts the associated CPU core which handles incoming packets. The packet is copied into the memory space of the target VM, and an interrupt is generated for the target VM for handing the packet. If packet buffers are not in user address space, additional buffer copying may be needed. If target VMs are serving high bandwidth connections, they may not be able to keep up with incoming packets and may run into a receive live-lock scenario.

Embodiments of the disclosure include non-blocking, event-based I/O loops, such as ring buffes, to avoid the receive live-lock situation. When a target VM boots up and its associated network interface is executing, one or more ring buffers comprising a non-blocking, event-based I/O loop, are pre-allocated in user memory space for each virtual network interface. Additional necessary metadata about the buffers for tracking their use, current positions, and the like, is maintained. The CPU core handing incoming packets know the physical address of the pre-allocated buffers in the target VM. The receiving entity in the target VM processes the data packet using the ring buffer, non-blocking I/O loop. As soon as packet data is transferred to the appropriate ring buffer, the socket polled by the receiving entity is signaled so the receiver entity can start processing the packet. Since data is posted straight to buffers in the application space, intermediate buffers such as kernel socket buffers are not necessary. The disclosed embodiments limit interrupt handling only to the core which handles incoming packets and eliminate interrupts at the target VM level. In addition, copying data directly to pre-allocated buffers in user space eliminates overhead that would otherwise be required for intermediate buffer copies.

Figure 1:
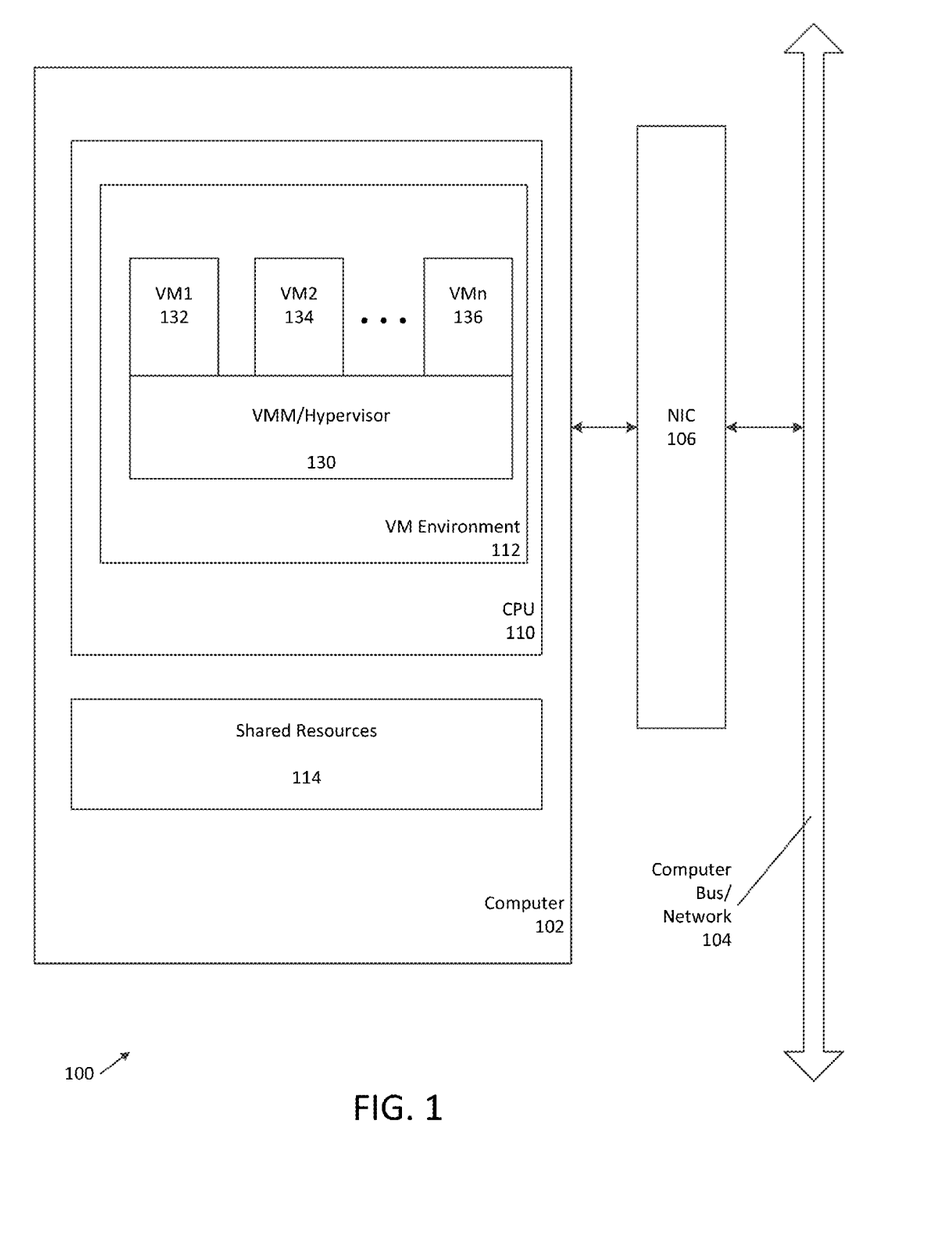
FIG. 1 is a schematic diagram of a computer system in which the disclosed techniques for data processing are utilized.

FIG. 1 is a schematic diagram of a computer system 100 in which the disclosed techniques for data processing can be utilized. In FIG. 1, a computer 102 of the system 100 is connected to a computer bus or communications network 104 by means of a network interface card (NIC) 106. The computer 102 includes a central processing unit (CPU) 110 and supports a virtual machine (VM) environment 112. The CPU 110 has access to shared resources 114, comprising resources such as memory, external data storage, print queues, and the like. Within the VM environment 112, the CPU supports a virtual machine manager (VMM) 130, also referred to as a hypervisor. The hypervisor 130 is responsible for supporting one or more virtual machines (VMs), depicted in FIG. 1 as comprising VMs 1, 2, . . . , n, which are indicated in FIG. 1 as the first VM, VM1 132, the second VM, VM2 134, and so forth, to the last nth VM, VMn 136.

Figure 2:
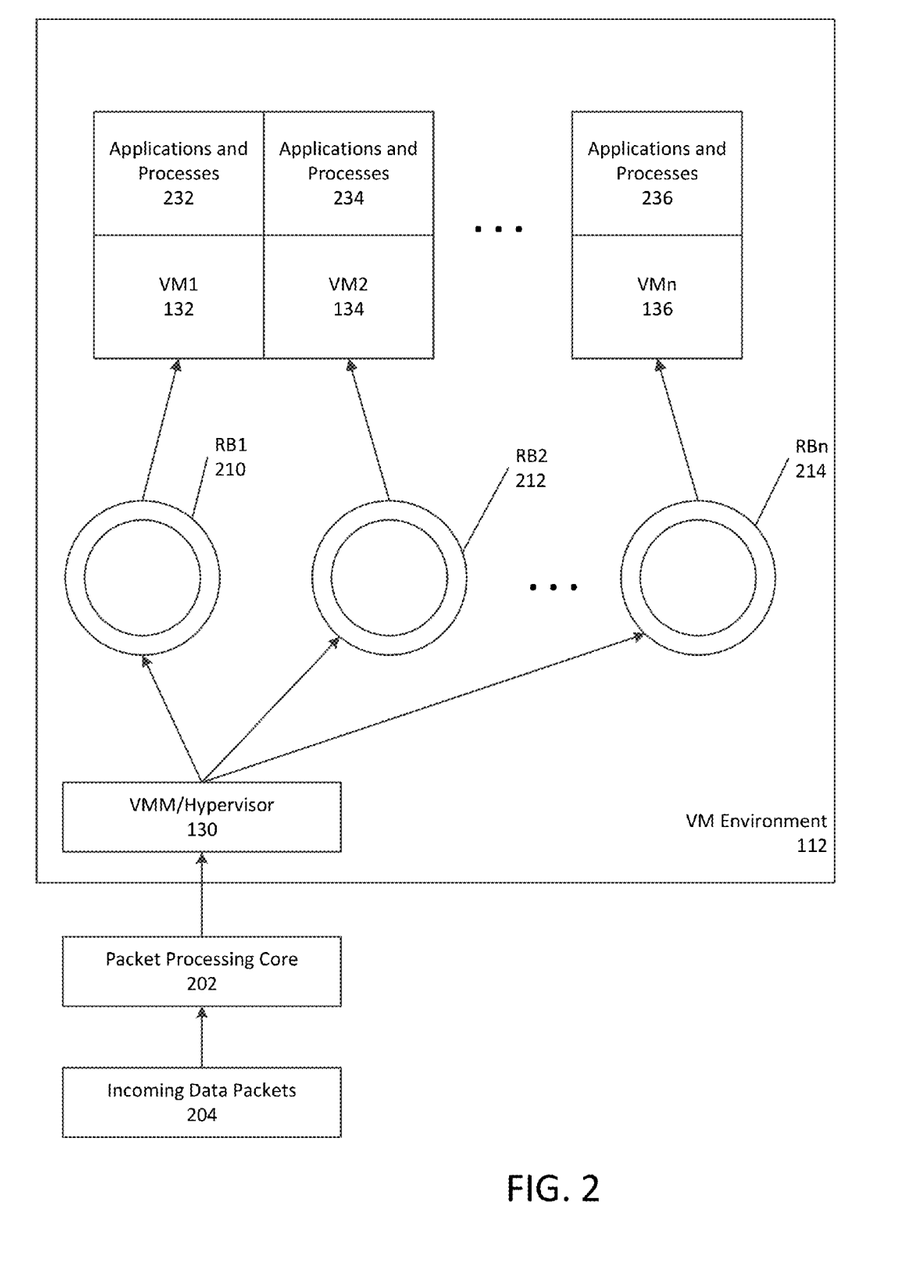
FIG. 2 is a schematic diagram showing details of the FIG. 1 computer system.

FIG. 2 is a schematic diagram showing details of the FIG. 1 computer system. FIG. 2 shows the VM environment 112, first depicted in FIG. 1, with the hypervisor 130 receiving data packets 204 for processing by the shared resources 114 (FIG. 1). FIG. 2 shows that the computer system includes a packet processing core 202 that receives the incoming data packets 204. The packet processing core 202 may be placed in a variety of locations within the computer system 100. For example, the packet processing core 202 may be placed within the computer 102 but external to the CPU 110, or it may be placed within the virtual environment 112 maintained by the CPU, or it may be placed in the NIC 106. The packet processing core may be implemented as a component of software executed by the CPU 110, or it may be implemented as a dedicated processor in the computer. When implemented as a dedicated processor, the packet processing core may be embodied in hardware, such as a semiconductor package connected to the CPU. The packet processing core may also be implemented as a combination of such schemes.

Within the VM environment 112, FIG. 2 shows multiple non-blocking, event-based I/O loops, which are implemented in the VM environment as n ring buffers (RBs): RB1 210, RB2 212, and through RBn 214. Each ring buffer RB1, RB2, . . . , RBn is associated with a corresponding virtual machine VM1, VM2, . . . , VMn, respectively. That is, RB1 is associated with VM1, and RB2 is associated with VM2, and so forth. In this context, "associated with" means that an RB is mapped onto the VM with which it is associated by the other operating components of the computer, such as by one or more of the packet processing core or the hypervisor or the CPU. Thus, RB1 processes packets intended for VM1, RB2 processes packets intended for VM2, and so forth. Each of the VMs 132, 134, 136 is depicted with an associated data space that includes applications and processes 232, 234, 236, respectively. As was the case with the packet processing core 202, the components comprising the ring buffers 210, 212, 214 and the VMs 132, 134, 136 and their corresponding applications and processes 232, 234, 236 may be implemented in a variety of locations within the computer system 100. For example, the components may be placed within the computer 102 but external to the CPU 110, or may be placed within the virtual environment 112 maintained by the CPU, or may be placed in the NIC 106. The components may be implemented as software executed by the CPU 110, or may be implemented in a physical embodiment, such as a semiconductor package connected to the CPU, or may be implemented as a combination of the two. The ring buffers themselves may be of any size needed or preferred, as dictated by system resources and requirements. For example, a ring buffer may have a storage capacity given in MB, GB, or other data capacities, such as 1 GB. The ring buffers for the virtual machines are generally each of the same size, but such uniformity is not required for operation of the disclosed system. The disclosure herein is not limited to any particular size or configuration or uniformity among the ring buffers and virtual machines and associated components.

After an incoming data packet 204 is received by the packet processing core 202, the data packet is provided to the hypervisor 130 by the packet processing core 202. Each data packet includes a VM-identifying domain name for the VM, or other VM identifying value that is inserted into the data packet by the shared resource or other network device external to the computer 102 that generated the data packet. At the hypervisor 130, the data packet is examined to determine the VM to which the data packet should be sent. The packet processing core 202 can translate the VM domain name into an IP address for the corresponding VM because, as described further below, the packet processing core knows the information comprising VM domain names and corresponding VM IP addresses. Determining the VM determines the corresponding ring buffer (RB). Thus, VM1 includes applications and processes 232, VM2 includes applications and processes 234, and VMn includes applications and processes 236, and VM1 includes a corresponding RB1, VM2 includes a corresponding RB2, and VMn includes a corresponding RBn.

Figure 3:
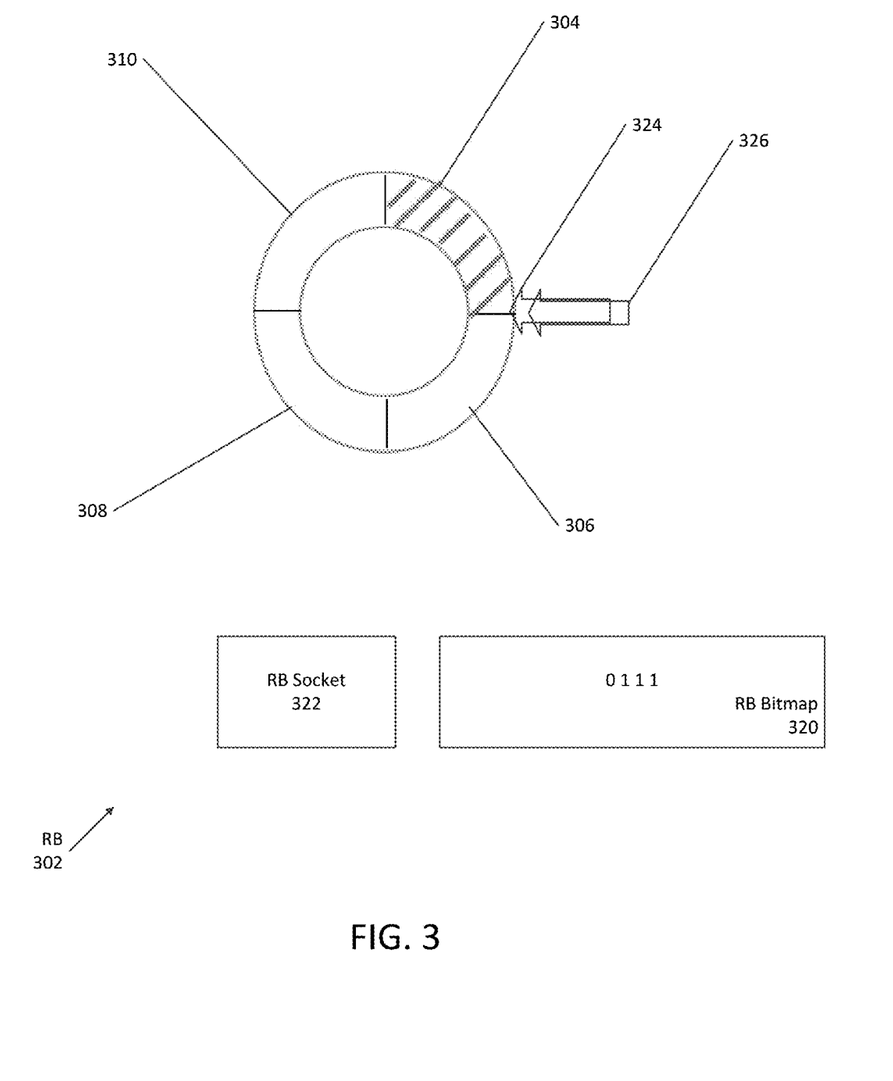
FIG. 3 is a schematic diagram that shows a ring buffer of FIG. 2 with a data packet stored within, and shows associated data comprising a ring buffer socket and ring buffer bitmap.
Figure 4:
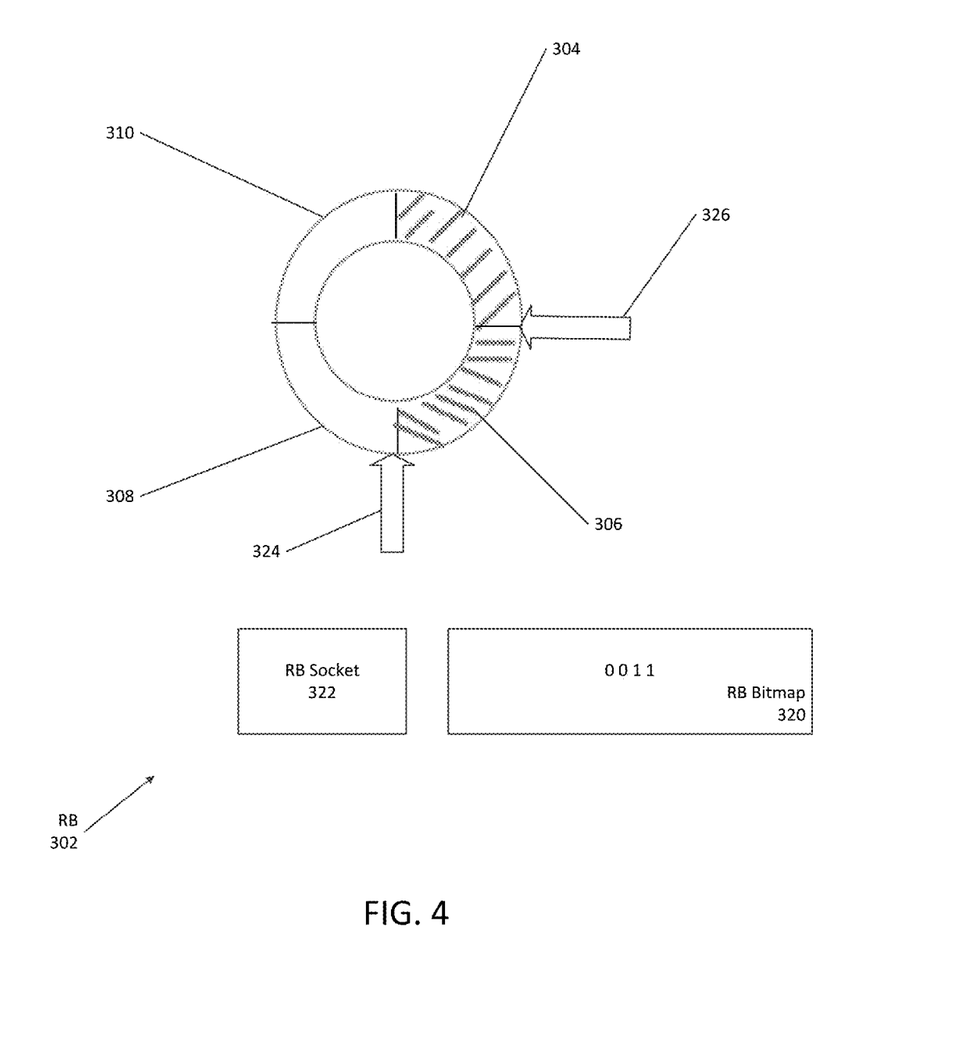
FIG. 4 is a schematic diagram that shows a ring buffer of FIG. 2 with multiple data packets stored within, and shows associated data comprising a ring buffer socket and ring buffer bitmap.

FIG. 3 is a schematic diagram that shows one of the ring buffers (RB) 302 with four storage partitions, or data sectors 304, 306, 308, 310. One of the RB storage data sectors 304 is shown with cross-hatching, to indicate that the data sector 304 of the RB 302 contains one or more data packets stored within. Each RB is also associated with an RB bitmap 320 and an RB socket 322 of the computer system. Each RB is also associated with a buffer write pointer 324 that includes a data value that points to the next available storage space in the RB for writing incoming data packets and also includes a read pointer 326 that includes a data value that points to the last read storage space in the RB. For example, in FIG. 3, the last data packet stored in the RB 302 filled the first data sector 304, so that the next available storage space in the RB for writing is the first storage position in the second data sector 306. As used herein, and as described further below, a "data packet" stored in the RB refers to the entire string of bits that is stored in the RB, including metadata, bitmap information, pointer information, and the like, as well as one or more packets that contain actual data payloads for use by system resources and that are intended for a particular VM. Thus, the ring buffer write pointer 324 is shown "pointing" to the data packet at the boundary between the first RB sector 304 and the second RB sector 306, where the next incoming data packet will be written. The RB 302 includes a read pointer as well as a write pointer. Thus, the RB write pointer 324 points to where the prior packet is the last written, and the subsequent "empty" space is the next to be written. The RB read pointer 326 has a data value that points to the last read storage space in the RB; in FIG. 3, the read pointer 326 is pointing at the same data packet as the write pointer, indicating that the last written data packet is also the last read data packet. The pointers 324, 326 point to a location at the boundary of a packet, not to the boundary of a data sector. The embodiment illustrated in FIG. 4 shows four data sectors 304, 306, 308, 310, and shows a simplified construction, for purposes of explanation only. The disclosure is not limited to any particular number of data sectors in the ring buffers. Any ring buffer, for example, may contain hundreds or thousands of data sectors, as dictated by system resources and requirements.

The packet processing core 202 will typically manage the data contained in the RB bitmap 320 and the RB pointer 324. The hypervisor 130 will typically control the value placed in the RB socket 322. The RB 302 may include a controller, not illustrated, that initiates operations described herein as "performed by the RB". The description of the RB 302 components and operations is exemplary only, and applies to each of the RBs of the system and VM environment 112. The various components, such as the hypervisor and the packet processing core, may communicate with each other so as to be aware of information that should be maintained current for the RB bitmap, socket, and pointer.

In FIG. 3, the RB bitmap 320 and the RB socket 322 are shown in the drawing figure for the RB 302 to illustrate that the bitmap 320 and socket 322 may be implemented as components in hardware or software that are separate from the RB, or may be implemented as part of the RB itself. The RBs may be implemented in a variety of locations within the computer system 100, and similarly for the RB socket and RB bitmap associated with each VM and RB. As noted above, the ring buffers themselves 210, 212, 214 may be of any size needed or preferred, as dictated by system resources and requirements.

The RB bitmap 320 identifies which of the partitions 302, 304, 306, 308 of the RB 302 is available for storage and which of the partitions contains a data packet. In the FIG. 3 example, the RB bitmap 320 value is illustrated as the binary value "0 1 1 1". The RB 302 interprets this value to indicate that the first partition 304 is not available for data storage, being already occupied, and interprets the RB bitmap value to indicate that the last three portions 306, 308, 310 are available for data storage. More particularly, a "1" bit in the RB bitmap indicates that the corresponding RB partition is available for data storage, because it is empty and has no data stored therein. A "0" bit indicates that the corresponding RB partition is not available for data storage, because it is occupied by data.

The RB socket 322 provides a flag, or wake-up value, to the RB 302 to indicate that a data packet has been stored into the RB 302 by the hypervisor 130 and is ready for processing. The RB socket 322 comprises a data register or other storage location that may be checked periodically in time by the associated RB 302. For example, the RB 302 may continuously poll the RB sockets of each of the RBs. At any checking of the RB socket value by the RB at a polling time, if the RB identifies that a predetermined wake-up value is at the RB socket, then the RB will take appropriate action to process the received data packet. For example, the predetermined wake-up value may comprise any non-zero value stored in the RB socket 322. In this way, the RB provides a convenient, efficient way of initiating data packet processing without resorting to the use of an interrupt-driven operation. This avoids the disruption in computer operation that typically occurs when a resource or other compute component involuntarily changes operation in response to a received interrupt. Instead of an interrupt, the disclosed system relies on regular polling of the RB socket by the RB to initiate responsive data packet processing.

The RB pointer 324, as noted above, includes a data value that points to the next available storage space in the RB. The packet processing core 202 will typically manage the data contained in the RB pointer 324. The RB pointer is shown in FIG. 3 as pointing at the next available storage space in the RB, but the RB pointer is maintained by the packet processing core to have a value that will be recognized by the RB as pointing to the next available storage space. That is, the storing of data in the RB is coordinated between the packet processing core and the hypervisor and the RB controller, if applicable, to manage an orderly and sequential storing of data in the available storage space of the RB.

FIG. 4 is a schematic diagram that shows a ring buffer of FIG. 2 with multiple data packets stored within, and shows associated data comprising a ring buffer socket and ring buffer bitmap. FIG. 4 shows with cross-hatching that the first two partitions 304, 306 of the RB 302 are occupied with data packets. The corresponding value of the RB bitmap 320 in FIG. 4 is illustrated with the binary value "0 0 1 1", a value that the RB 302 interprets to indicate that the first two partitions 302, 304 are occupied with data packets and are not available for data storage. Thus, the RB interprets the bitmap value to indicate that the last two portions 308, 310 are available for data storage. FIG. 4 also shows that the RB pointer 324 has an updated value that indicates the pointer is now "pointing" to the boundary between the second partition 306 and the third partition 308. The data value of the RB pointer 324 is maintained current by the packet processing core 202.

Figure 5:
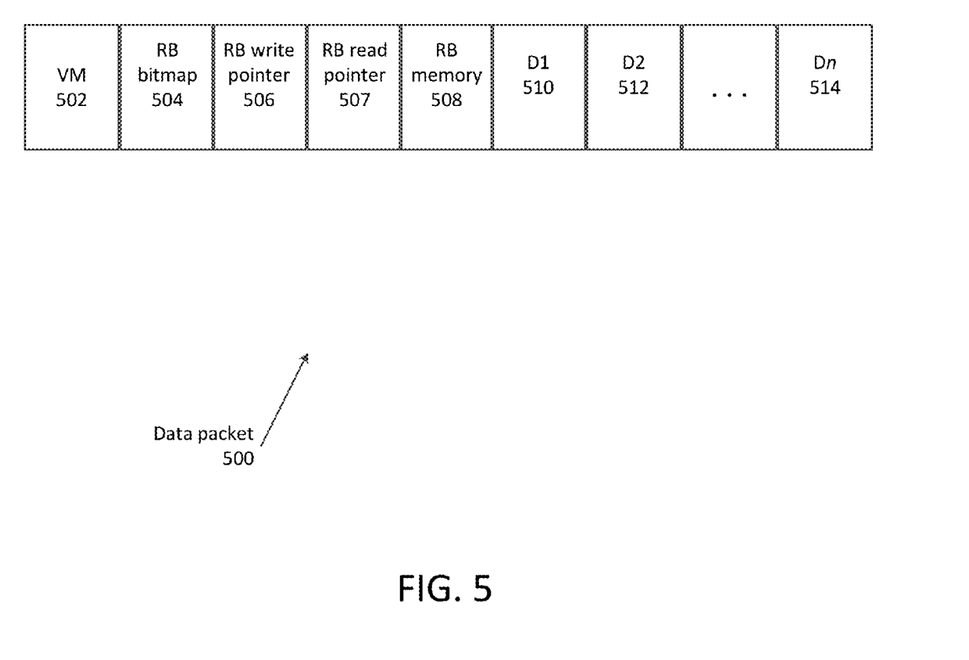
FIG. 5 is a schematic diagram of an alternate embodiment of the VM environment in the computer system.

FIG. 5 is a block diagram representation of a data packet 500 received at the packet processing core 202 for distribution among the VMs of the system 100. FIG. 5 shows the types of data fields that may comprise what is referred to herein as a "data packet". More particularly, a data packet 500 may include metadata fields for a VM domain name 502, a bitmap value 504 for the RB of the associated VM, an RB write pointer value 506 of the RB for the associated VM, an RB read pointer value 507 of the RB for the associated VM, a value 508 that indicates available memory in the RB, and one or more packets comprising the data payload for the data packet 500. In FIG. 5, the data payload is illustrated as n data fields D1, D2, . . . , Dn labeled 510, 512, 514, respectively. The metadata fields containing the VM identification information 502, the RB bitmap 504, the RB write pointer 506, the RB read pointer 507, and the available RB memory 508 comprise the minimum set of metadata needed by the packet processing core and hypervisor to properly implement the techniques discussed herein. The overall size of the data packet 500 in bits may be any arbitrary size, as dictated by system resources and desired performance. Similarly, the data payloads 510, 512, 514 may be any number of bits, in accordance with the system resources and desired performance.

Figure 6:
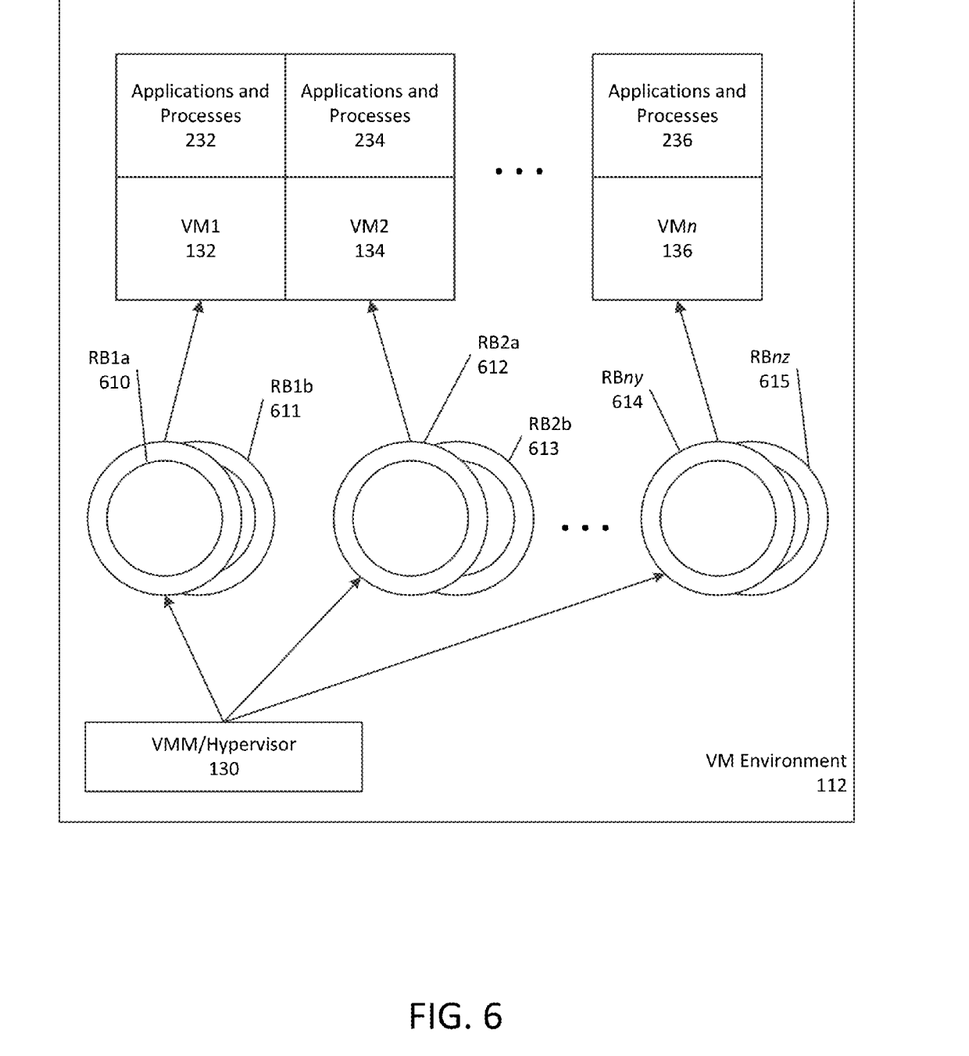
FIG. 6 is a schematic diagram of an alternate embodiment of the VM environment in the computer system.

FIG. 6 is a schematic diagram of an alternate embodiment of the VM environment in the computer system. FIG. 6 is similar to FIG. 2 in showing the VM environment 112, except that FIG. 6 shows an embodiment with multiple ring buffers for each VM. The system generally includes one RB per VM per interface. Some systems may have more than one interface per VM, such as where a VM receives data from multiple sources, and each source communicates with the VM via a different interface. Hence, in the case of multiple interfaces, there likely will be a different RB for each respective interface per VM, and each RB will have its own read and write pointers, as described above in the case for a single RB for a single-interface VM.

Thus, in FIG. 6, for VM1 132, there are two ring buffers, indicated as RB1a 610 and RB1b 611. The additional ring buffer RB1b provides additional storage capacity for the VM. The two RBs 610, 611 otherwise each operate similarly to the description for FIGS. 2-4. Each RB 610, 611 will have corresponding bitmaps, buffer pointers, sockets, and the like. Similarly, the second virtual machine VM2 134 has two ring buffers, a first buffer RB2a 612 and a second buffer RB2b 613. Lastly, the nth virtual machine VMn 136 has two ring buffers, a first buffer RBny 614 and a second buffer RBnz 615. All of the RBs illustrated 610, 611, 612, 613, 614, 615 each operate similarly to the description of the RBs for FIGS. 2-4 and each will have corresponding bitmaps, buffer pointers, sockets, and the like.

Figure 7:
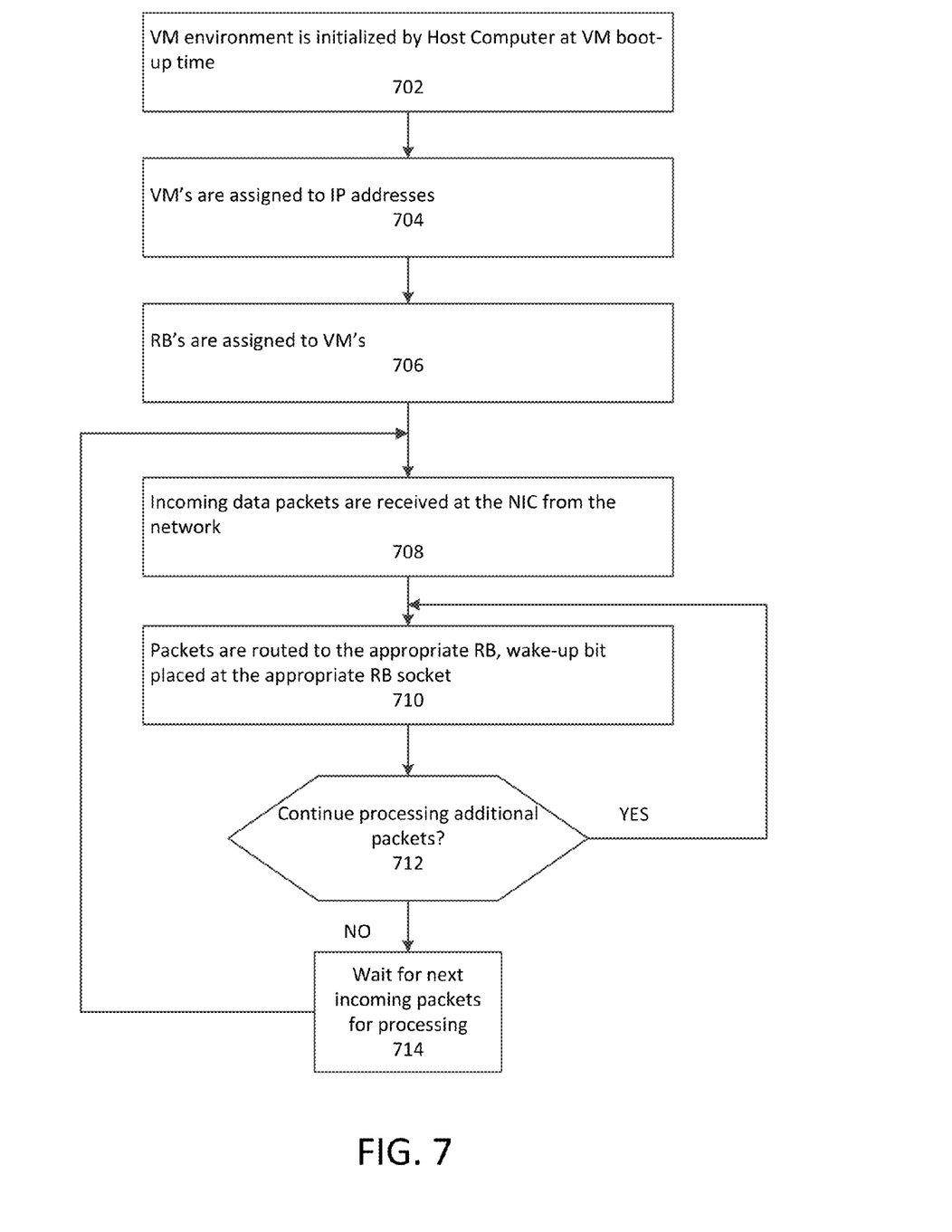
FIG. 7 is a flow diagram that illustrates operations of the FIG. 1 system for establishing a virtual environment and processing data packets in accordance with the disclosed techniques.

FIG. 7 is a flow diagram that illustrates operations of the FIG. 1 system for establishing a virtual environment and processing data packets in accordance with the disclosed techniques. In the first operation 702 of FIG. 7, the VM environment is initialized by the host computer 102 at the time the host computer establishes the VM environment 112 at VM boot-up time.

In the second illustrated operation 704, the VM's are assigned to respective IP addresses, by which the VM's are given an address on the network 104 with which the NIC 106 interfaces. The IP address assignment occurs at boot-up time for each respective VM, the time at which the respective VMs are instantiated, or created in the VM environment 112. The packet processing core 202 manages the mapping of IP addresses to VM domain names, which are in turn assigned by the hypervisor 130.

In the third illustrated operation 706, the RB's are created and assigned to corresponding VM's in the system. The RB creation and the RB assignments for each VM are typically managed by the hypervisor 130, but different computer systems may implement the RB creation and assignment process using other components of the computer system. Such arrangements are equally compatible with the techniques disclosed herein, so long as the RB and VM relationships are maintained as described herein. The RB's are instantiated and are for storing data packets that are received, for further processing. The RB's are shared in the user space for application use and are therefore readily accessible for data processing.

At the diagram box 708, incoming data packets are received at the NIC 106 from the network 104. The incoming data packets are then routed to the packet processing core 202, where they are forwarded on to the hypervisor 130, which in turn forwards the data packets to the appropriate RB and VM pair. Alternatively, the packet processing core 202 may send the data packets directly to the RB via a direct memory access (DMA) operation. If the packet processing core sends the data packets directly to the RBs, then the packet processing core informs the hypervisor 130 that it has done so, by sending an appropriate communication to the hypervisor.

At the next operation depicted in FIG. 7, the diagram box 710, received data packets are routed by the packet processing core 202 or the hypervisor 130 to the appropriate RB, and the packet processing core 202 or the hypervisor 130 (as noted in the paragraph above) places the predetermined wake-up value at the corresponding RB socket 322 of the appropriate RB. The wake-up value is typically any non-zero bit value.

After the data packets are properly routed and the wake-up bit value is stored, and the RB performs the processing of the received data packets, the packet processing core 202 or the hypervisor 130 determines whether additional data packets have been received at the packet processing core 202. If additional data packets remain to be processed, an affirmative outcome at the decision box 712, then packet processing is continued at the diagram box 710. If there are no additional data packets, a negative outcome at the decision box 710, then the processing of the current packet is completed. As indicated by the diagram box 714, additional packets can be received at any time, and therefore the illustrated flow returns operation to the flow diagram box 708, where the system waits for the next received packets.

Figure 8:
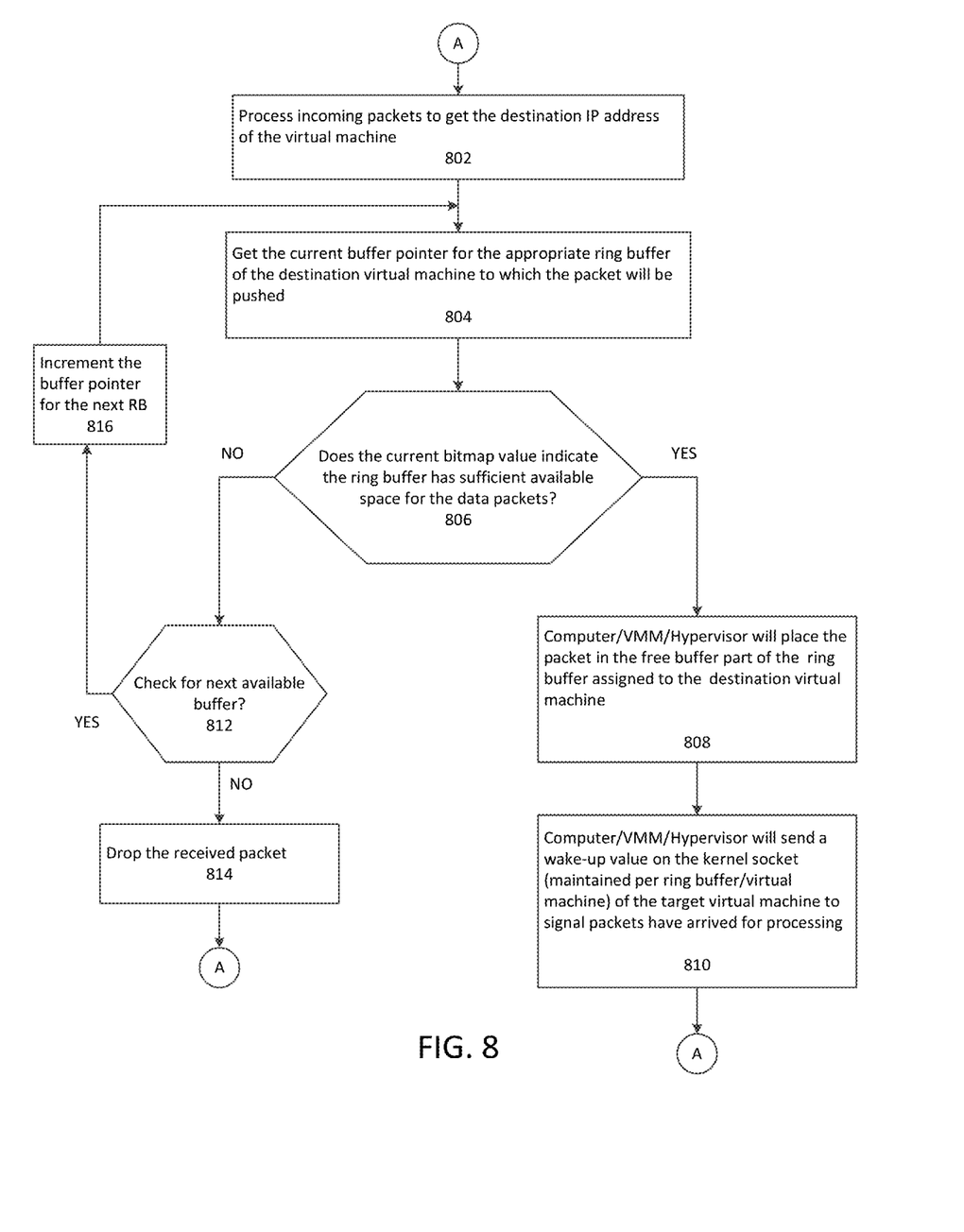
FIG. 8 is a flow diagram that illustrates operations of the FIG. 1 system for processing data packets.

FIG. 8 is a flow diagram that illustrates operations of the FIG. 1 system for processing data packets. In the first operation of FIG. 8, indicated by the flow diagram box 802, the packet processing core receives incoming packets 204 (see FIG. 2) and processes them to get the destination IP address of the VM for which the data packets are intended.

At the next illustrated operation, at the diagram box 804, the hypervisor 130 gets the current buffer pointer value for the appropriate RB of the destination VM to which the packet will be pushed.

The hypervisor next examines the RB bitmap value for the corresponding RB to determine if the bitmap value indicates that the corresponding RB has sufficient available space for the received data packets. This determination is illustrated in FIG. 8 by the decision box 806.

If the bitmap value indicates that the corresponding RB does have sufficient available space for the received data packets, an affirmative outcome at the decision box 806, then system operation proceeds to the diagram box 808. At the diagram box 808, the computer 102 or hypervisor 130 will place the received packet in the free buffer part of the RB assigned to the destination VM.

After the data packet has been placed in the available partition of the RB, the next operation is illustrated by the diagram box 810, which indicates that the computer, or VMM, or Hypervisor, will send a wake-up value on the kernel socket of the target VM to indicate that data packets have arrived for processing. System operation then proceeds back to the first illustrated operation 802, as indicated by the flow diagram connector A.

Returning to the operation illustrated by the decision box 806, if the bitmap value indicates that the corresponding RB does not have sufficient available space for the received data packets, a negative outcome at the box 80x, then at the box 812, the packet processor determines if another buffer is available at the RB to take the data packet. If there is no other available buffer, a negative outcome at the decision box 812, then the received data packet is dropped. This drop operation is indicated at the next diagram box, at the box 814. The dropped packet will be re-sent by the packet processing core or the hypervisor, because no acknowledgement message will be received at the packet processing core or hypervisor, and in response the packet processing core or hypervisor will cause the sending resource to re-send the dropped packet. System operation then proceeds back to the first operation 802, as indicated by the flow diagram connector A. If there is another available buffer for taking the data packet that could not fit into the first RB, an affirmative outcome at the decision box 812, then at the diagram box 816, the packet processing core 202 increments the buffer pointer for the next available RB. System operation then proceeds back to the first operation 802, as indicated by the flow diagram connector A.

Figure 9:
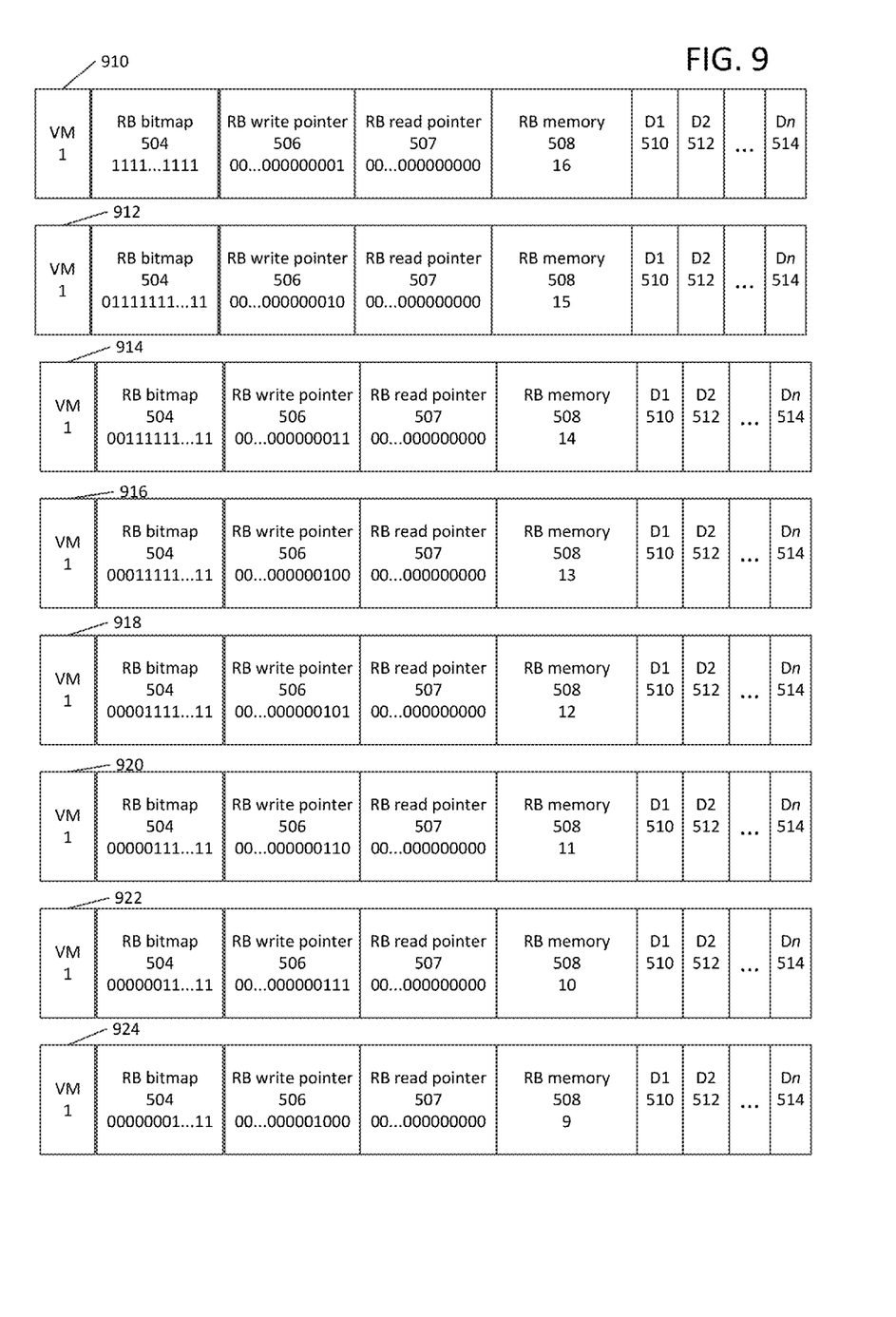
FIG. 9 is a block diagram representation of a sequence of eight data packets received at the packet processing core 202 for distribution among the VMs of the system 100.
Figure 10:
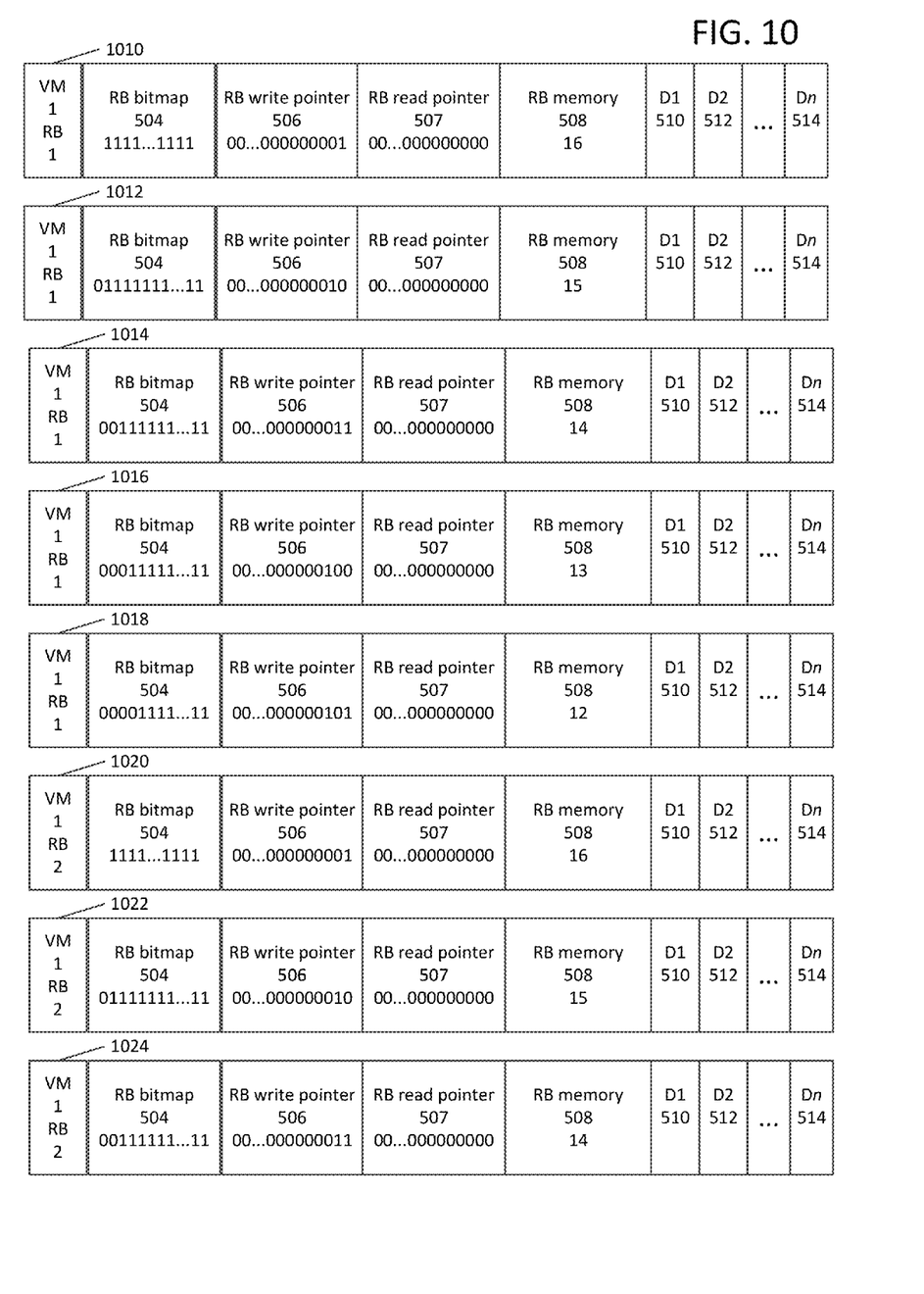
FIG. 10 is a block diagram representation of a sequence of eight data packets received at the packet processing core 202 for distribution among the VMs of the system 100.
Figure 11:
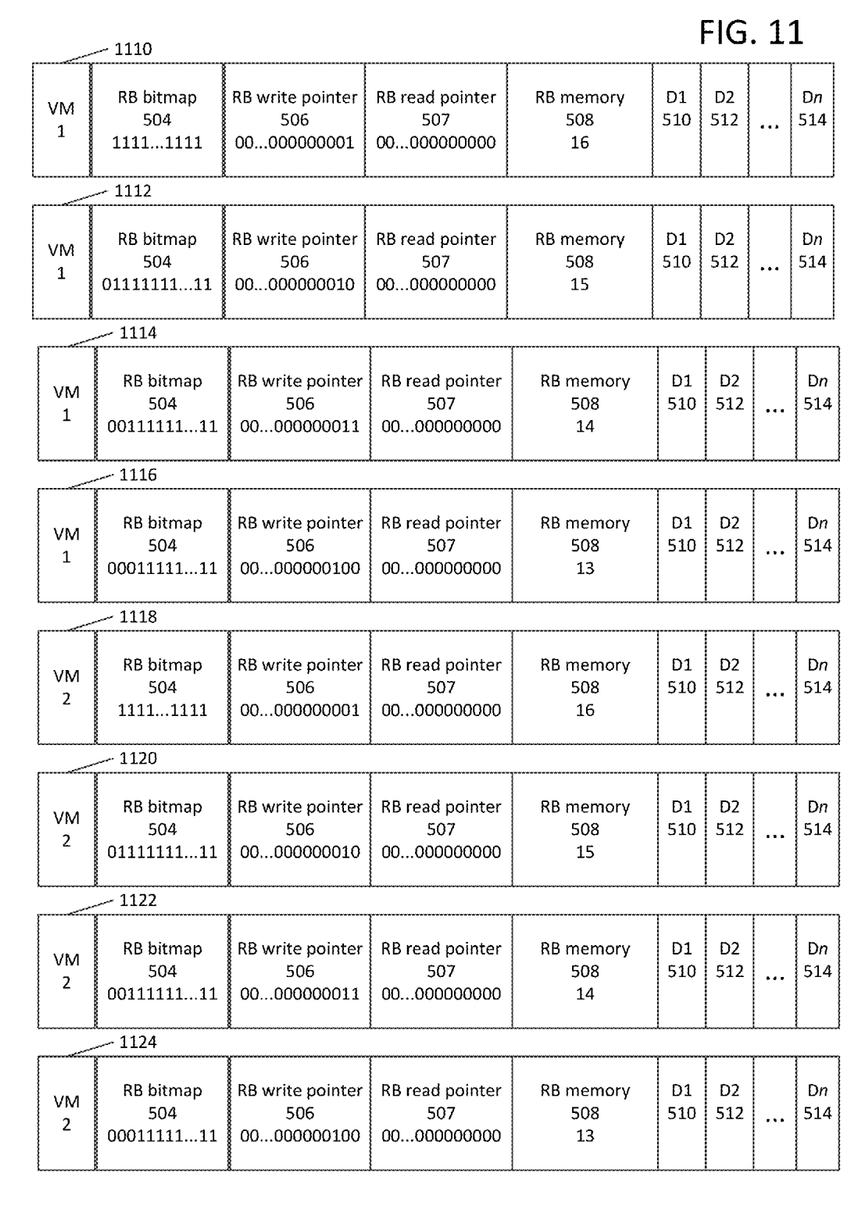
FIG. 11 is a block diagram representation of a sequence of eight data packets received at the packet processing core 202 for distribution among the VMs of the system 100.

As noted above, different configurations of virtual machines and associated memory can be accommodated in accordance with the disclosed embodiments. The configurations can process a stream of data packets received and may include, for example, data packets intended for a single VM, data packets intended for multiple RB's of one or more VM's, and data packets intended for single RB's of multiple VM's. Such example scenarios are illustrated in the block diagram representations of FIGS. 9, 10, and 11. The data packet representations of FIGS. 9, 10, and 11 are based on the data packet representation of FIG. 5. For simplicity and for ease of understanding, the data field numbering of FIG. 5 is maintained in FIGS. 9, 10, and 11. For simplicity and for ease of understanding, the VM configurations for the discussion in FIGS. 9, 10, and 11 will be presumed to be RB's of sixteen units. In each of FIGS. 9, 10, and 11, the received data packets are illustrated as a sequence of eight data packets. As noted above, the units of the RB's may represent MB's, GB's, or other capacities, according to the system requirements and resources of the system 100.

FIG. 9 is a block diagram representation of a sequence of eight data packets received at the packet processing core 202 for distribution to VM1 of the system 100. That is, all eight data packets 910, 912, 914, . . . , 924 are intended for VM1. In the first data packet, labeled 910 in FIG. 9, the intended VM is indicated as VM1 in the first field 502 (see FIG. 5). In all of the data packets illustrated in FIG. 9, the intende5d VM is identified as VM1. In the first data packet 910, the bitmap value indicates that the RB is empty, and all of the storage locations are available. Therefore, the bitmap field 504 is all 1's digits in the sixteen bits of the bitmap, one bit for each of the sixteen units in the RB. The availability is indicated as 1111 . . . 1111 for the bitmap value. The write pointer field 506 is pointing to the first position in the RB, indicated by a pointer value of 000 . . . 0001. The read pointer field 507 is zero because no data has been read from the RB. The RB memory is indicated as being completely available; that is, sixteen units are available, indicated by the memory field 508.

In the next data packet 912, FIG. 9 shows that the bitmap has a zero in the leading bit position of the bitmap. This indicates that the first unit has been occupied, in this case, occupied by the first packet 910. The second packet 912 has a write pointer value 506 that has been incremented by one, with respect to the write pointer value 506 in the first packet 910. The memory value has been decremented by one, to indicate that of the sixteen units available, one has been occupied by the first packet 910 and therefore fifteen units remain available. The read pointer value 507 remains at zero, no reads having taken place.

In the third data packet 914, the pattern continues, with another zero added to the leading bits of the bitmap, to show that the first two units are now occupied by the first two data packets 910 and 912, while the last fourteen units are available. Similarly, the write pointer value 506 has been updated, the memory available value 508 has been decremented. The read pointer value 507 is still zero, indicating that no read operation has taken place, so that it is still pointing to the first (zero) data read position. Each of the fourth through eighth data packets 916, 918, 920, 922, and 924 continuous with similar changes in data field values, to reflect the processing of a new data packet in each instance, each data packet including respective data payloads D1, D2, . . . Dn.

FIG. 10 is a block diagram representation of a sequence of eight data packets 1010, 1012, 1014, . . . , 1024 received at the packet processing core 202 for distribution intended for VM1 of the system 100. In the case of FIG. 10, however, the first five data packets received are intended for the first RB associated with VM1, while the last three data packets received are intended for the second RB associated with VM1. Hence, the first five data packets have a VM field 502 of "VM1 RB1" and the last three data packets have a VM field of "VM1 RB2". The various data fields of the RB bitmap 504, RB write pointer 506, the RB read pointer 507, and the RB memory 508 each reflect the changes as each data packet is processed, similar to the changes depicted in FIG. 9. The packet processing core 202 or VMM/Hypervisor 130, depending on the construction of the system 100, will recognize the value in the VM field 502 so that "VM1 RB1" will be correctly interpreted as referring to RB1 of VM1, and "VM1 RB2" will be correctly interpreted as referring to RB2 of VM1. Similarly, the value in the RB read and write pointer fields 506, 507 and the value in the RB memory field 508 will be understood by the processing core or VMM/Hypervisor as referring to the correct RB (RB1 or RB2) of VM1. The data field values in the eight packets illustrated in FIG. 10 incorporate changes in the successive data field values in accordance with the processing of each data packet, to reflect the processing of prior data packets in each instance of a new data packet. Each data packet includes respective data payloads D1, D2, . . . Dn.

FIG. 11 is a block diagram representation of a sequence of eight data packets 1110, 1112, 1114, . . . , 1124 received at the packet processing core 202 and intended for VM1 and VM2 of the system 100. More particularly, of the eight received data packets illustrated in FIG. 11, the first four data packets are intended for VM1, and the second four data packets are intended for VM2. This is indicated by the values in the VM field being either VM1 or VM2. As before, the packet processing core 202 or VMM/Hypervisor 130, depending on the construction of the system 100, will recognize the value in the VM field 502 so that "VM1" will be correctly interpreted as a data packet intended for VM1, and "VM2" will be correctly interpreted as a data packet intended for VM2. Similarly, the value in the RB read and write pointer fields 506, 507 and the value in the RB memory field 508 will be understood by the processing core or VMM/Hypervisor as referring to the correct VM (VM1 or VM2). The data field values in the eight packets illustrated in FIG. 11 incorporate changes in the successive data field values in accordance with the processing of each data packet, to reflect the processing of prior data packets for VM1 or VM2, as the case may be, in each instance of a new data packet. Each data packet includes respective data payloads D1, D2, . . . Dn.

Thus, the processing core 202 or the VMM/Hypervisor 130 will recognize the value in the VM field 502 so that the proper VM and/or RB will be understood, and similarly, the proper RM field values for bitmaps, pointers, and memory availability will be associated with the proper VM and RB.

As noted above, the RB's are allocated at the time the VM's are instantiated, and therefore, the CPU, which processes the data packets, will know the physical address of the VM to copy the packet to, on the intended VM. Therefore, DMA-remapping should not be required, increasing the efficiency of the virtualization system. That is, whenever an intended VM is instantiated and boots up, and if the network interface associated with it is up and running, then pointers of data packet buffers can be assigned to the VM, pointing to fixed-size data packet buffers that are shared in the user space as well, for application processing. This supports a "zero copy" operating scheme such that data packets need not be copied among system resources for proper processing of the data packets.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method of processing data in a virtualization system that is managed by a virtual machine manager, the method comprising:

receiving an incoming data packet at a network interface card of the virtualization system, wherein the data packet is intended for a target virtual machine of the virtualization system;

determining a destination network address of the target virtual machine from the received data packet;

identifying a write buffer pointer from the received data packet, wherein the write buffer pointer points to a first location in a buffer associated with the target virtual machine, the first location corresponding to a next available location for writing to the associated buffer;

determining if the associated buffer has sufficient available space to accept the received data packet; and responsive to determining that the associated buffer has sufficient available space;

storing, by the virtual machine manager, the received data packet in the next available location based on the write buffer pointer, and sending a wakeup byte data message from the virtual machine manager to a designated socket of the target virtual machine, wherein the designated socket is configured to, in response to receiving the wakeup byte data message, set a flag that is polled periodically without generating an interrupt for the target virtual machine, and wherein in response to the setting of the flag being identified through the polling, the stored data packet is retrieved from the associated buffer to initiate processing of the stored data packet.

2. The method as in claim 1, further comprising:
responsive to determining that the associated buffer is lacking sufficient available space to accept the received data packet, refraining from storing the received data packet in the associated buffer.

3. The method as in claim 1, wherein the associated buffer is a ring buffer.

4. The method as in claim 3, wherein available space in the ring buffer is indicated by a bitmap.

5. The method as in claim 4, wherein the bitmap is included in the received data packet.

6. The method as in claim 1, further comprising:
identifying a read buffer pointer from the received data packet, wherein the read buffer pointer points to a second location in the associated buffer, the second location corresponding to a next location in the associated buffer for reading data.

7. The method as in claim 1, wherein the target virtual machine includes multiple interfaces for communication, and further includes one buffer for each interface of the multiple interfaces.

8. The method as in claim 1, further comprising:
instantiating, by the virtual machine manager, the target virtual machine; and allocating, by the virtual machine manager and in a memory space of the target virtual machine, at least one buffer for storing data packets for the target virtual machine, the at least one buffer including the associated buffer into which the received data packet is stored, and wherein each buffer of the at least one buffer comprises a non-blocking input/output loop that polls for the flag set by a corresponding instance of the dedicated socket.

9. The method as in claim 1, wherein determining if the associated buffer has sufficient available space to accept the received data packet comprises examining a bitmap containing information on available locations in the associated buffer, and wherein the bitmap is included in the received data packet.

10. The method as in claim 9, further comprising:
storing, in the associated buffer, the bitmap together with a data payload of the received data packet.

11. A virtualization system comprising:
a network interface card at which is received an incoming data packet intended for a target virtual machine of the virtualization system;
a designated socket for the target virtual machine; and
a virtual machine manager that:

determines a destination network address of the target virtual machine from the received data packet, identifies a write buffer pointer from the received data packet, wherein the write buffer pointer points to a first location in a buffer associated with the target virtual machine, the first location corresponding to a next available location for writing to the associated buffer, and determines if the associated buffer has sufficient available space to accept the received data packet;

wherein, responsive to determining that the associated buffer has sufficient available space, the virtual machine manager:

stores the received data packet in the next available location based on the write buffer pointer, and sends a wakeup byte data message to the designated socket; and wherein the designated socket is configured to, in response to receiving the wakeup byte data message, set a flag that is polled periodically without generating an interrupt for the target virtual machine, and wherein in response to the setting of the flag being identified through the polling, the stored data packet is retrieved from the associated buffer to initiate processing of the stored data packet.

12. The virtualization system as in claim 11, wherein the virtual machine manager, responsive to determining that the associated buffer is lacking sufficient available space to accept the received data packet, refrains from storing the received data packet in the associated buffer.

13. The virtualization system as in claim 11, wherein the associated buffer is a ring buffer.

14. The virtualization system as in claim 13, wherein available space in the ring buffer is indicated by a bitmap.

15. The virtualization system as in claim 14, wherein the bitmap is included in the received data packet.

16. The virtualization system as in claim 11, wherein the virtual machine manager identifies a read buffer pointer from the received data packet, and wherein the read buffer pointer points to a second location in the associated buffer, the second location corresponding to a next location in the associated buffer for reading data.

17. The virtualization system as in claim 11, wherein the target virtual machine includes multiple interfaces for communication, and further includes one buffer for each interface of the multiple interfaces.

18. The virtualization system as in claim 11, wherein the virtual machine manager instantiates the target virtual machine and allocates, in a memory space of the target virtual machine, at least one buffer for storing data packets for the target virtual machine, the at least one buffer including the associated buffer into which the received data packet is stored, and wherein each buffer of the at least one buffer comprises a non-blocking input/output loop that polls for the flag set by a corresponding instance of the dedicated socket.

19. The virtualization system as in claim 11, wherein the virtual machine manager determines if the associated buffer has sufficient available space to accept the received data packet by examining a bitmap containing information on available locations in the associated buffer, and wherein the bitmap is included in the received data packet.

20. The virtualization system as in claim 19, wherein the virtual machine manager stores, in the associated buffer, the bitmap together with a data payload of the received data packet.

* * * * *

UNITED STATES PATENT AND TRADEMARK OFFICE
CERTIFICATE OF CORRECTION

PATENT NO. : 10,270,715 B2
APPLICATION NO. : 15/340459
DATED : April 23, 2019
INVENTOR(S) : Sharma Page 1 of 1

It is certified that error appears in the above-identified patent and that said Letters Patent is hereby corrected as shown below:

In the Specification

In Column 3, Line 49, delete "buffes," and insert -- buffers, --, therefor.

In Column 10, Line 16, delete "intende5d" and insert -- intended --, therefor.

In the Claims

In Column 13, Line 4, Claim 1, delete "space;" and insert -- space: --, therefor.

Signed and Sealed this
Twenty-first Day of July, 2020

Andrei Iancu
*Director of the United States Patent and Trademark Office*